(12) United States Patent
Takagi et al.

(10) Patent No.: US 9,322,459 B2
(45) Date of Patent: Apr. 26, 2016

(54) VEHICULAR AUTOMATIC TRANSMISSION

(71) Applicant: AISIN SEIKI KABUSHIKI KAISHA, Kariya-shi, Aichi-ken (JP)

(72) Inventors: Kiyoharu Takagi, Okazaki (JP); Atsuhiro Mase, Aichi-ken (JP); Hideki Nakamura, Nagoya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/677,505

(22) Filed: Apr. 2, 2015

(65) Prior Publication Data
US 2015/0285343 A1 Oct. 8, 2015

(30) Foreign Application Priority Data
Apr. 4, 2014 (JP) ................................. 2014-077422

(51) Int. Cl.
*F16H 3/62* (2006.01)
*F16H 3/66* (2006.01)

(52) U.S. Cl.
CPC .......... *F16H 3/66* (2013.01); *F16H 2200/0069* (2013.01); *F16H 2200/201* (2013.01); *F16H 2200/2048* (2013.01); *F16H 2200/2064* (2013.01); *F16H 2200/2094* (2013.01)

(58) Field of Classification Search
CPC .............. F16H 3/66; F16H 2200/0069; F16H 2200/2094; F16H 2200/201; F16H 2200/2046
See application file for complete search history.

(56) References Cited

U.S. PATENT DOCUMENTS

| 7,131,926 | B2 | 11/2006 | Tiesler et al. | |
|---|---|---|---|---|
| 7,828,688 | B2 | 11/2010 | Phillips et al. | |
| 2012/0165156 | A1* | 6/2012 | Oguri | F16H 3/66 477/111 |
| 2013/0196808 | A1* | 8/2013 | Ziemer | B60K 6/547 475/5 |
| 2013/0244822 | A1* | 9/2013 | Iizuka | F16H 3/62 475/59 |
| 2013/0244823 | A1* | 9/2013 | Iizuka | F16H 3/62 475/59 |
| 2014/0073473 | A1* | 3/2014 | Maurer | F16H 3/66 475/279 |
| 2014/0349799 | A1* | 11/2014 | Kaltenbach | B60K 6/48 475/5 |
| 2014/0364271 | A1* | 12/2014 | Kaltenbach | F16H 3/006 475/286 |
| 2015/0087470 | A1 | 3/2015 | Takagi et al. | |
| 2015/0247556 | A1* | 9/2015 | Takagi | F16H 3/66 475/278 |
| 2015/0267810 | A1* | 9/2015 | Kaltenbach | F16H 61/688 475/209 |

\* cited by examiner

*Primary Examiner* — David J Hlavka
(74) *Attorney, Agent, or Firm* — Buchanan Ingersoll & Rooney PC

(57) ABSTRACT

A vehicular automatic transmission, includes: a housing; input and output shafts sustained to be rotatable around a rotation shaft line in the housing; single pinion type first, second and third planetary gears sustained in parallel coaxially with the rotation shaft line; a first brake fixing a third ring gear of the third planetary gear to be disengageable with respect to the housing; a first clutch linking the third ring gear and a second carrier of the second planetary gear to be disengageable from each other; and a switching element blocking the link between the input shaft and the first carrier, and switching the input shaft to be in a switched state, wherein, in a reverse gear shift stage, the first clutch is in an engaged state, the first brake is in a fixed state, and the switching element is in a switched state.

8 Claims, 8 Drawing Sheets

FIG.2

|      | CL1 | CL2 | CL3 | CL4 | B1 | B2 | SE |
|------|-----|-----|-----|-----|----|----|----|
| Rev  | O   | O   |     |     | O  |    | R  |
| 1st  |     | O   |     | O   | O  |    | L  |
| 2nd  |     |     | O   | O   | O  |    | L  |
| 3rd  |     |     |     | O   | O  | O  | L  |
| 3rd' |     | O   |     |     | O  | O  | L  |
| 4th  | O   | O   |     |     | O  |    | L  |
| 5th  | O   | O   |     |     |    | O  | L  |
| 6th  | O   | O   | O   |     |    |    | L  |
| 7th  | O   |     | O   |     |    | O  | L  |
| 8th  |     | O   | O   |     |    | O  | L  |
| 9th  | O   |     |     | O   |    | O  | L  |
| 10th |     | O   |     | O   |    | O  | L  |

FIG.6

|      | CL1 | CL2 | CL3 | CL4 | B1 | B2 | SE |
|------|-----|-----|-----|-----|----|----|----|
| Rev  |     | ○   | ○   |     | ○  |    | R  |
| 1st  |     | ○   |     | ○   | ○  |    | L  |
| 2nd  | ○   | ○   |     |     | ○  |    | L  |
| 3rd  |     | ○   |     |     | ○  | ○  | L  |
| 4th  |     | ○   | ○   |     | ○  |    | L  |
| 5th  |     | ○   | ○   |     |    | ○  | L  |
| 6th  | ○   | ○   | ○   |     |    |    | L  |
| 7th  | ○   |     | ○   |     |    | ○  | L  |
| 8th  |     |     | ○   | ○   |    | ○  | L  |
| 9th  | ○   |     |     | ○   |    | ○  | L  |
| 10th |     | ○   |     | ○   |    | ○  | L  |

VEHICULAR AUTOMATIC TRANSMISSION

CROSS REFERENCE TO RELATED APPLICATIONS

This application is based on and claims priority under 35 U.S.C. §119 to Japanese Patent Application 2014-077422, filed on Apr. 4, 2014, the entire contents of which are incorporated herein by reference.

TECHNICAL FIELD

This disclosure relates to a vehicular automatic transmission which shifts rotation of an input shaft which is rotationally driven by an engine or the like of a vehicle into a plurality of gear shift stages and transfers that to an output shaft.

BACKGROUND DISCUSSION

In the related art, a vehicular automatic transmission which can form a gear shift stage having ten forward gear stages and one reverse gear stage is disclosed. For example, in a technology which is disclosed in U.S. Pat. No. 7,828,688 (Reference 1) illustrated below, by providing three single pinion type planetary gears and six engaging elements, and among these, by engaging three elements with each other, gear shift stages having ten forward gear stages and one reverse gear stage are formed.

The vehicular automatic transmission illustrated in U.S. Pat. No. 7,828,688 (Reference 1) is configured as described below. A first planetary gear which includes a first carrier linked to an output shaft can select a link between the first carrier and a second sun gear of a second planetary gear via a first clutch, and a link between a first sun gear and the second sun gear via a second clutch. In a third planetary gear which includes a third carrier linked to the output shaft, a second ring gear of the second planetary gear is linked to the third carrier, and a first ring gear of the first planetary gear is linked to a third sun gear. A second carrier of the second planetary gear can select a link with a third ring gear of the third planetary gear via a third clutch. Also, the third ring gear can select a link with a fixing member via a first brake. The first sun gear can select a link with the fixing member via a second brake. The first ring gear can select a link with the second carrier via a fourth clutch. By fastening the first carrier of the first planetary gear which is linked to the input shaft with the second sun gear of the second planetary gear by engaging the first clutch, fastening the second carrier of the second planetary gear with the third ring gear of the third planetary gear by engaging the third clutch, and fixing the second carrier with the first brake, a reverse gear shift stage makes reverse rotation of which a rotating direction is reverse to that of an input shaft to the second ring gear of the second planetary gear. Then, the reverse rotation of the input shaft is output from the output shaft which is linked to the third carrier of the third planetary gear linked to the second ring gear. In this manner, since the reverse rotation is made to the second planetary gear only by an input into the second planetary gear and by fastening the brake, the third ring gear of the third planetary gear is fixed by the first brake, and the third carrier reversely rotates. For this reason, the third sun gear passively reversely rotates, and reversely rotates at a higher speed than that of the third carrier. Since the first ring gear of the first planetary gear which is linked to the third sun gear reversely rotates, and the input rotation is input by the input shaft into the first carrier, the first sun gear of the first planetary gear is subjected to rotate at a high speed as the speed reaches the highest rotating speed in the reverse gear shift stage. Therefore, increasing the rotating speed of the first sun gear influences durability of a bearing member or the like which supports the first sun gear, and suppression of an increase in the rotating speed is required.

SUMMARY

Thus, a need exists for a vehicular automatic transmission which is not susceptible to the drawback mentioned above.

An aspect of this disclosure is directed to a vehicular automatic transmission, including: a housing; an input shaft which is sustained to be rotatable around a rotation shaft line in the housing; an output shaft which is sustained to be rotatable around the rotation shaft line in the housing; single pinion type first, second and third planetary gears which are sustained in parallel coaxially with the rotation shaft line in the housing as the input shaft and a first carrier of the first planetary gear are linked to each other, the output shaft and a third carrier of the third planetary gear are linked to each other, the third carrier and a second ring gear of the second planetary gear are linked to each other, and a third sun gear and a first ring gear of the first planetary gear are linked to each other; a first brake which fixes a third ring gear of the third planetary gear to be disengageable with respect to the housing; a first clutch which links the third ring gear and a second carrier of the second planetary gear to be disengageable from each other; and a switching element which blocks the link between the input shaft and the first carrier, and switches the input shaft to be in a switched state in which the input shaft is linked to a second sun gear of the second planetary gear and a first sun gear of the first planetary gear. In a reverse gear shift stage, the first clutch is in an engaged state, the first brake is in a fixed state, and the switching element is in a switched state.

Another aspect of this disclosure is directed to a vehicular automatic transmission including: a housing; an input shaft which is sustained to be rotatable around a rotation shaft line in the housing; an output shaft which is sustained to be rotatable around the rotation shaft line in the housing; single pinion type first, second and third planetary gears which are sustained in parallel coaxially with the rotation shaft line in the housing as the input shaft and a first carrier of the first planetary gear are linked to each other, the output shaft and a third carrier of the third planetary gear are linked to each other, the first carrier and a second sun gear of the second planetary gear are linked to each other, the third carrier and a second ring gear of the second planetary gear are linked to each other, and a third sun gear and a first ring gear of the first planetary gear are linked to each other; a first brake which fixes a third ring gear of the third planetary gear to be disengageable with respect to the housing; a third clutch which links the third ring gear and a second carrier of the second planetary gear to be disengageable from each other; a switching element which blocks the link between the input shaft and the first carrier, and switches the input shaft to be in a switched state in which the input shaft is linked to the second sun gear of the second planetary gear and a first sun gear of the first planetary gear; and a first clutch which links the first carrier and the second sun gear of the second planetary gear to be disengageable from each other. In a reverse gear shift stage, the first clutch is in a disengaged state, the third clutch is in an engaged state, the first brake is in a fixed state, and the switching element is in a switched state.

BRIEF DESCRIPTION OF THE DRAWINGS

The foregoing and additional features and characteristics of this disclosure will become more apparent from the following detailed description considered with the reference to the accompanying drawings, wherein:

FIG. 2 is a view illustrating a state where each engaging element is operated in each gear shift stage of the first embodiment;

FIG. 6 is a view illustrating a state where each engaging element is operated in each gear shift stage of the third embodiment;

DETAILED DESCRIPTION

Figure 1:
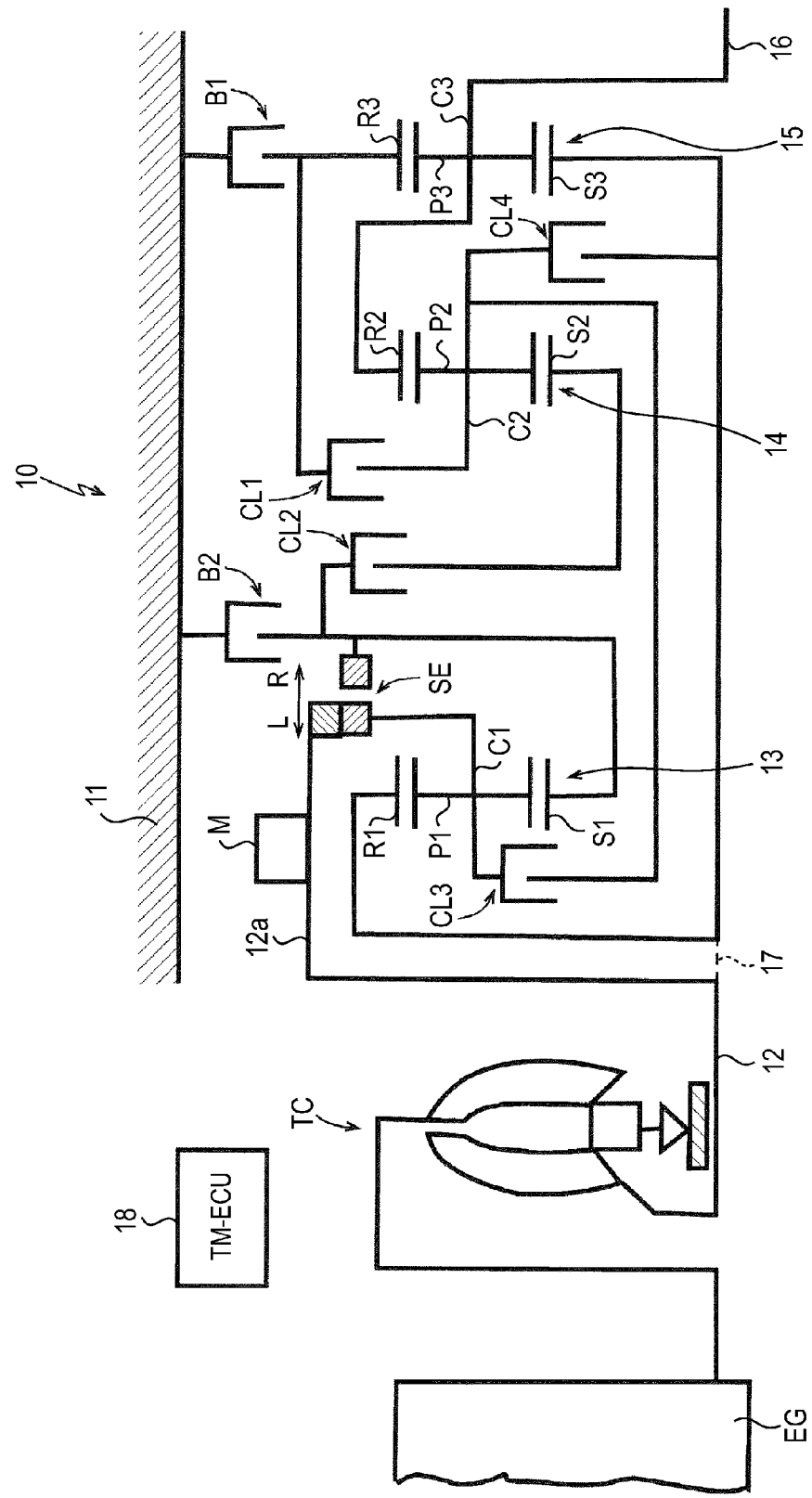
FIG. 1 is a schematic skeleton diagram illustrating a first embodiment of a vehicular automatic transmission of this disclosure.

A vehicular automatic transmission according to this disclosure will be described with reference to the drawings. In addition, in the drawings which will be referred to hereinafter, the same members or the members which correspond to the same members will be given the same reference numerals.
First Embodiment Hereinafter, a first embodiment of this disclosure will be described with reference to FIGS. 1 to 3. With reference to FIG. 1, a vehicular automatic transmission 10 according to the embodiment is used such that output rotation of an engine EG is input via a torque converter TC, a speed of input rotation which is input is changed, and the input rotation is transferred to a pair of driving wheels (not illustrated). The vehicular automatic transmission 10 includes a housing 11 which is attached to a vehicle body, an input shaft 12 which is sequentially sustained to be rotatable coaxially with a rotation shaft line 17 in the housing 11, a first planetary gear 13, a second planetary gear 14, a third planetary gear 15, and an output shaft 16.

The first planetary gear 13 includes a first sun gear S1 which is sustained to be rotatable coaxially with the rotation shaft line 17, a first ring gear R1, a first pinion P1 which meshes with the first sun gear S1 and the first ring gear R1, and a first carrier C1 which sustains the first pinion P1. The first planetary gear 13 is a single pinion type planetary gear mechanism.

The second planetary gear 14 includes a second sun gear S2 which is sustained to be rotatable coaxially with the rotation shaft line 17, a second ring gear R2, a second pinion P2 which meshes with the second sun gear S2 and the second ring gear R2, and a second carrier C2 which sustains the second pinion P2. The second planetary gear 14 is a single pinion type planetary gear mechanism.

The third planetary gear 15 includes a third sun gear S3 which is sustained to be rotatable coaxially with the rotation shaft line 17, a third ring gear R3, a third pinion P3 which meshes with the third sun gear S3 and the third ring gear R3, and a third carrier C3 which sustains the third pinion P3. The third planetary gear 15 is a single pinion type planetary gear mechanism.

The input shaft 12 and the output shaft 16 are supported in the housing 11 and sustained to be rotatable around the rotation shaft line 17. The input shaft 12 is a shaft member which transfers output rotation power of the engine EG via the torque converter TC, and inputs the rotation power to the vehicular automatic transmission 10. The output shaft 16 is a shaft member which outputs the rotation power of which the speed is changed to the driving wheel via a differential gear (not illustrated) or the like.

The first carrier C1 of the first planetary gear 13 is linked to the input shaft 12 via an input linking member 12a. The input linking member 12a is disposed outside in a radial direction in the housing 11. The third carrier C3 of the first planetary gear 13 is linked to the output shaft 16.

The second ring gear R2 of the second planetary gear 14 is linked to the third carrier C3 of the third planetary gear 15. The third sun gear of the third planetary gear 15 is linked to the first ring gear R1 of the first planetary gear.

A first brake B1 fixes the third ring gear R3 of the third planetary gear 15 to be disengageable with respect to an inner circumferential surface of the housing 11. A first clutch CL1 links the third ring gear R3 and the second carrier C2 of the second planetary gear 14 to be disengageable from each other.

A second clutch CL2 links the first sun gear S1 of the first planetary gear 13 and the second sun gear S2 of the second planetary gear 14 to be disengageable from each other.

A third clutch CL3 links the first carrier C1 of the first planetary gear 13 and the second carrier C2 of the second planetary gear 14 to be disengageable from each other.

A fourth clutch CL4 links the second carrier C2 of the second planetary gear 14, and the first ring gear R1 of the first planetary gear 13 and the third sun gear S3 of the third planetary gear 15 that are linked to each other, to be disengageable from each other.

A second brake B2 fixes the first sun gear S1 of the first planetary gear 13 to be disengageable with respect to the inner circumferential surface of the housing 11.

A switching element SE switches a linked state with the input shaft 12 to a non-switched state and a switched state. The switching element SE has a function of switching a position to two positions, and for example, the switching element SE can switch the position to two positions, such as an L position which is in a non-switched state, and an R position which is in a switched state, as a dog clutch type which is a meshing type clutch. In addition, the switching element SE can also use a synchromesh type switching element. As illustrated in FIG. 1, at the L position, the switching element SE links the input shaft 12 and the first carrier C1 via the input linking member 12a. In addition, at the R position, the switching element SE blocks the link between the input shaft 12 and the first carrier C1, and links the input shaft 12 and the second sun gear S2 which is linked via the first sun gear S1 and the second clutch CL2.

Operations of the first clutch CL1, the second clutch CL2, the third clutch CL3, the fourth clutch CL4, the first brake B1, the second brake B2, and the switching element SE are controlled by a transmission ECU (hereinafter, simply referred to as a TM-ECU) 18.

The input linking member 12a which is linked to the input shaft 12 is a linking member which extends in a direction of the rotation shaft line 17 through the outer circumferential side of the first ring gear R1. The input linking member 12a passes a path which is positioned on the outermost circumference inside the housing 11, and can link the first planetary gear 13 or the second planetary gear 14 via the switching element SE. For this reason, regardless of the gear shift stage, from the input linking member 12a, it is always possible to take off power of the rotation which is the same as that of the input rotation by an external power take-off member M, and to achieve a so-called power take-off function.

As illustrated in FIG. 2, as the vehicular automatic transmission 10 which is configured as described above selectively disengages the first clutch CL1, the second clutch CL2, the third clutch CL3, and the fourth clutch CL4, selectively allows the first brake B1 and the second brake B2 to operate, and allows the switching element SE to perform the switching operation, rotation of each element of the first planetary gear 13, the second planetary gear 14, and the third planetary gear 15 is restricted. Accordingly, the gear shift stage having ten or more forward gear stages and one reverse gear stage is established. In FIG. 2, a case where a white circle is marked in sections of each clutch and brake which correspond to each gear change stage, illustrates a connected and engaged state in a case of a clutch, and illustrates a fixed state where the rotation is restricted in a case of the brake. A case where an L is marked in the section of the switching element SE illustrates an L position, and a case where an R is marked illustrates a switched state at the R position.

Similarly to the first planetary gear 13, the second planetary gear 14, and the third planetary gear 15, in the single pinion type planetary gear mechanism, a relationship between the rotating speed of the sun gear Ns, the rotating speed of the carrier Nc, the rotating speed of the ring gear Nr, and a gear ratio of the planetary gear mechanism $\lambda$, is illustrated in Formula (1), and the gear ratio in each gear shift stage is calculated based on Formula (1). When the number of teeth of the sun gears S1, S2, and S3 are set to be Zs1, Zs2, and Zs3, and the number of teeth of the ring gears R1, R2, and R3 are set to be Zr1, Zr2, and Zr3, the gear ratios of the first pinion P1, the second pinion P2, and the third pinion P3 are respectively $\lambda 1=Zs1/Zr1$, $\lambda 2=Zs2/Zr2$, and $\lambda 3=Zs3/Zr3$.

$$Nr=(1+\lambda)Nc-\lambda Ns \qquad (1)$$

In addition, only one of 3rd and 3rd' gear shift stages may be performed, or the 3rd' gear shift stage may be performed following the 3rd gear shift stage.

By the TM-ECU 18, switching is performed into the R position at which the first brake B1 is in a fixed state, the first clutch CL1 and the second clutch CL2 are in an engaged state, and the switching element SE is in a switched state. Accordingly, the reverse gear shift stage is obtained. In addition, when the switching is performed into the R position of the switching element SE, by maintaining a state where at least one of the first clutch CL1 and the second clutch CL2 is in a disengaged state, or maintaining a state where the first brake B1 is in an unfixed state, at least one of the second planetary gear 14 and the third planetary gear 15 is in a free state. After switching is performed into the R position of the switching element SE, by allowing the first clutch CL1 and the second clutch CL2 which correspond to the clutch which is in a maintained state described above to be in an engaged state, or allowing the first brake B1 which is in a maintained state described above to be in a fixed state, the output rotation of the engine EG is transferred to the driving wheel from the vehicular automatic transmission 10.

Figure 3:
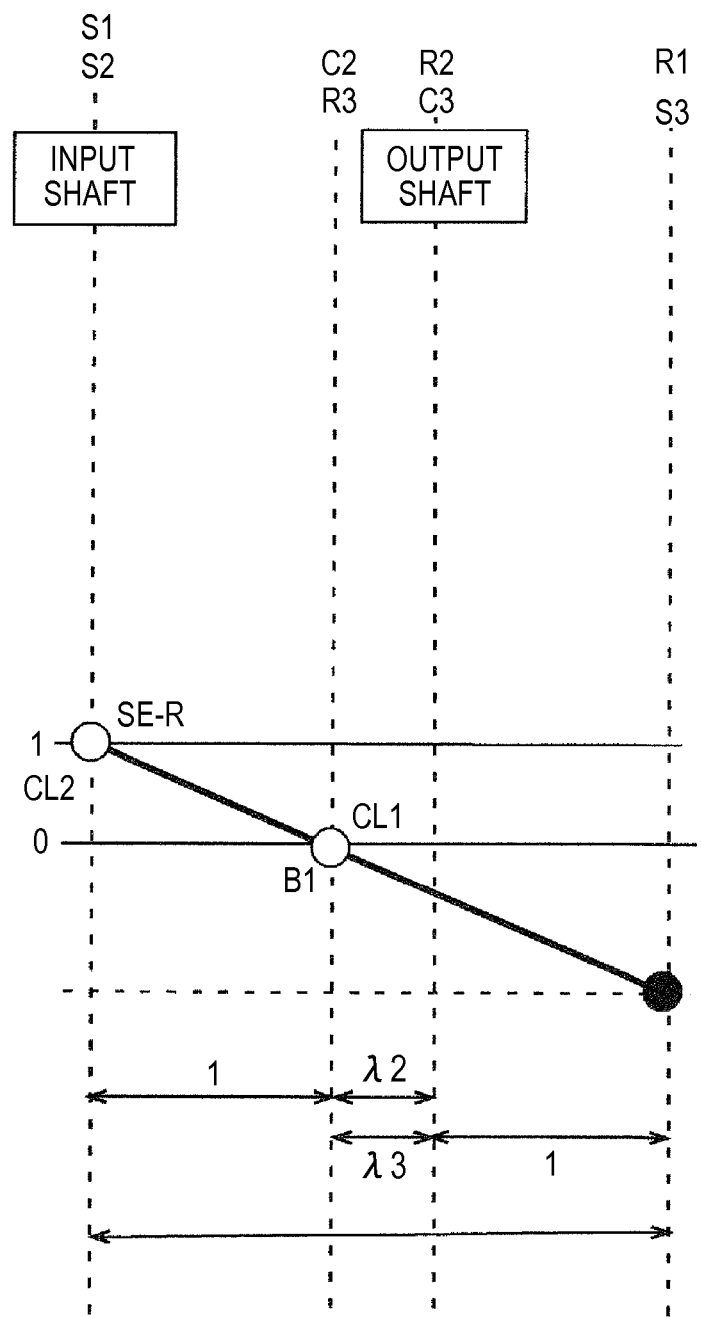
FIG. 3 is a velocity diagram illustrating a speed ratio of each element of a planetary gear in a reverse gear shift stage of the first embodiment.

A velocity ratio of each element of the first planetary gear 13, the second planetary gear 14, and the third planetary gear 15 in the reverse gear shift stage shows a state which is illustrated in a velocity diagram illustrated in FIG. 3. In other words, the third carrier C3 which is connected to the second ring gear R2 as described above is linked to the output shaft 16, the first ring gear R1 and the third sun gear S3 are linked, the second ring gear R2 and the third carrier C3 are linked, the second carrier C2 and the third ring gear R3 are linked by the first clutch CL1, and the input shaft 12, the first sun gear S1, and the second sun gear S2 are linked to each other by the switching element SE and the second clutch CL2. For this reason, in the velocity diagram illustrated in FIG. 3, each one vertical line that is given S1 and S2, C2 and R3, R2 and C3, and R1 and S3 is disposed in a direction of a horizontal axis with a certain interval corresponding to the gear ratio, and the velocity ratio corresponding to each element is illustrated in a direction of a vertical axis.

Since the third planetary gear 15 is the single pinion type planetary gear mechanism, the interval between the vertical line of the third ring gear R3 and the vertical line of the third sun gear S3 is considered as $1+\lambda 3$, and on the same side as that of the vertical line of the third ring gear R3 when viewed from the vertical line of the third sun gear S3, the vertical line of the third carrier C3 is disposed to be separated from the vertical line of the third sun gear S3 only by an interval 1.

In addition, since the second planetary gear 14 is the single pinion type planetary gear mechanism similarly to the third planetary gear 15, the interval between the vertical line of the second ring gear R2 and the vertical line of the second carrier C2 is considered as $\lambda 2$, and on a side opposite to the vertical line of the second ring gear R2 when viewed from the vertical line of the second carrier C2, the vertical line of the second sun gear S2 is disposed to be separated from the vertical line of the second carrier C2 only by the interval 1.

In the velocity diagram of the reverse gear shift stage illustrated in FIG. 3, the CL1 to CL2, the B1, and the SE-R, are respectively written at points where the first clutch CL1, the second clutch CL2, the first brake B1, and the switching element SE are selectively operated to the R position.

In the velocity diagram illustrated in FIG. 3, elements which correspond to each of four vertical lines are a first constituent element, a second constituent element, a third constituent element, and a fourth constituent element from left in order of arrangement of the vertical lines. In the first embodiment, the first sun gear S1 and the second sun gear S2 as the first constituent elements, are linked to each other by the second clutch CL2, and are linked to the input shaft 12 by switching the position into the R position of the switching element SE. The second carrier C2 and the third ring gear R3 as the second constituent elements are linked by the first clutch CL1, and are not rotated by the first brake B1. The second ring gear R2 and the third carrier C3 as the third constituent elements are linked. The third sun gear S3 and the first ring gear R1 as the fourth constituent elements are linked. The output shaft 16 is linked to the third carrier of the third linking element.

Hereinafter, the operations of the reverse gear shift stage will be described.

In the reverse gear shift stage, the link between the first carrier C1 of the first planetary gear 13 and the input shaft 12 is blocked as the switching element SE is in a switch state of the R position, and the input shaft 12 is linked to the first sun gear S1 of the first planetary gear 13. As the second clutch CL2 is connected, the first sun gear S1 is linked to the second sun gear S2 of the second planetary gear 14. Accordingly, the input rotation from the input shaft 12 is input into the second sun gear S2. As the first clutch CL1 is connected, the second carrier C2 of the second planetary gear 14 is linked to the third ring gear R3 of the third planetary gear 15. As the first brake B1 is operated, the third ring gear R3 is fixed to the housing 11. For this reason, the second carrier C2 and the third ring gear R3 are fixed and do not rotate. Accordingly, the reverse rotation of which a rotating direction is reverse to that of the input shaft 12 is generated to the second ring gear R2 of the second planetary gear 14. The reverse rotation is transferred to the third carrier C3 of the third planetary gear 15 which is linked to the second ring gear R2, and is output from the output shaft 16 which is linked to the third carrier C3.

In the reverse gear shift stage, since the third ring gear R3 is fixed, the third carrier C3 rotates reversely to the rotation of the input shaft 12, and the rotating speed of the third carrier C3 is the same as that of the output of the output shaft 16, the third sun gear S3 of the third planetary gear 15 reversely rotates and the rotating speed of the third sun gear S3 becomes a higher rotating speed than that of the output. The rotating speed of the first ring gear R1 of the first planetary gear 13 which is linked to the third sun gear S3 is the same as the rotating speed of the third sun gear S3. The rotating speed of the first ring gear R1 becomes the highest rotating speed in the reverse gear shift stage.

Hereinafter, the rotating speed (illustrated in FIG. 3) of the first ring gear R1 which becomes the highest rotating speed in the reverse gear shift stage according to the embodiment, and the rotating speed of the first sun gear S1 of the first planetary gear (illustrated in FIG. 8) which becomes the highest rotating speed in the reverse gear shift stage of the technology according to the above-described Reference 1, will be compared. In the reverse gear shift stage in the technology according to Reference 1, the first carrier C1 of the first planetary gear into which the input rotation is input from the input shaft is linked to the second sun gear S2 of the second planetary gear, the second carrier C2 of the second planetary gear and the third ring gear R3 of the third planetary gear are linked, fixed, and do not rotate, the second ring gear R2 of the second planetary gear and the third carrier C3 of the third planetary gear are linked, the third sun gear S3 of the third planetary gear and the first ring gear R1 of the first planetary gear are linked, and the output shaft is linked to the third carrier C3. For this reason, a case where each one vertical line that is given S1, C1 and S2, C2 and R3, R2 and C3, and R1 and S3 is disposed in the direction of the horizontal axis with a certain interval that corresponds to the gear ratio, and the velocity ratio corresponding to each element is illustrated in the direction of the vertical axis, is illustrated in FIG. 8.

Figure 8:
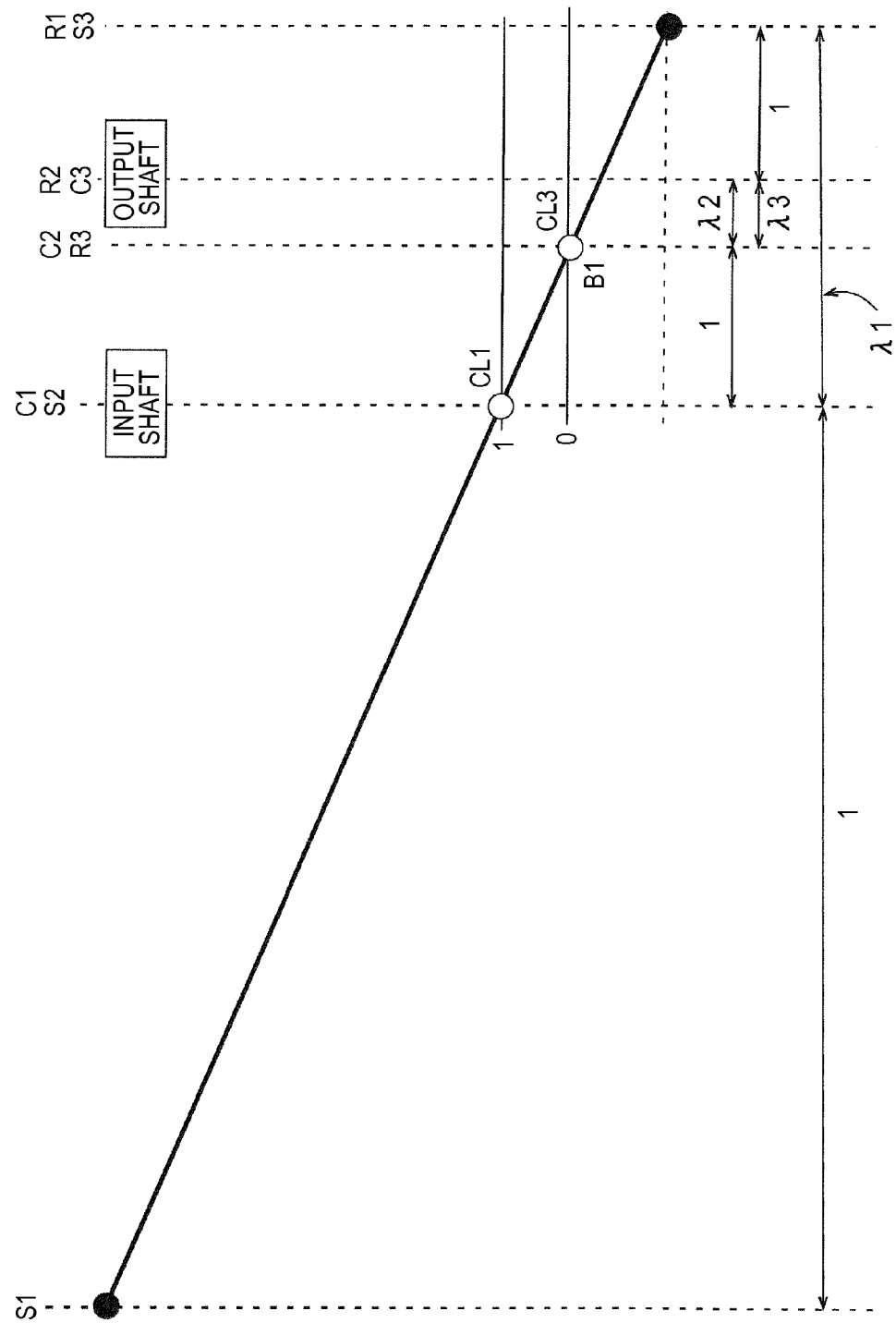
FIG. 8 is a velocity diagram illustrating a speed ratio of each element of a planetary gear in a reverse gear shift stage in the related art.

As illustrated in FIGS. 3 and 8, since the rotating speed (illustrated in FIG. 3) of the first ring gear R1 which becomes the highest rotating speed in the reverse gear shift stage according to the embodiment is low compared to the rotating speed (higher rotating speed than that of the first ring gear R1 illustrated in FIG. 8) of the first sun gear S1 which is the highest rotating speed illustrated in FIG. 8, an increase in rotating speed is suppressed. In addition, in the first sun gear S1 of the first planetary gear 13 according to the embodiment, the input rotation from the input shaft 12 is input by the switching the position into the R position of the switching element SE. For this reason, as illustrated in FIG. 3, the rotating speed of the first sun gear S1 is lower than the rotating speed of the first ring gear R1 which is linked to the third sun gear S3. For this reason, the rotating speed of the first ring gear R1 becomes the highest rotating speed in the reverse gear shift stage.

In addition, in this configuration, even when the switching element is not provided, by fastening the second clutch CL2, the third clutch CL3, and the first brake B1, it is possible to form the reverse gear stage. In addition, when the switching element SE is provided, it is possible to further suppress the rotation of the first sun gear S1.

Second Embodiment

Figure 4:
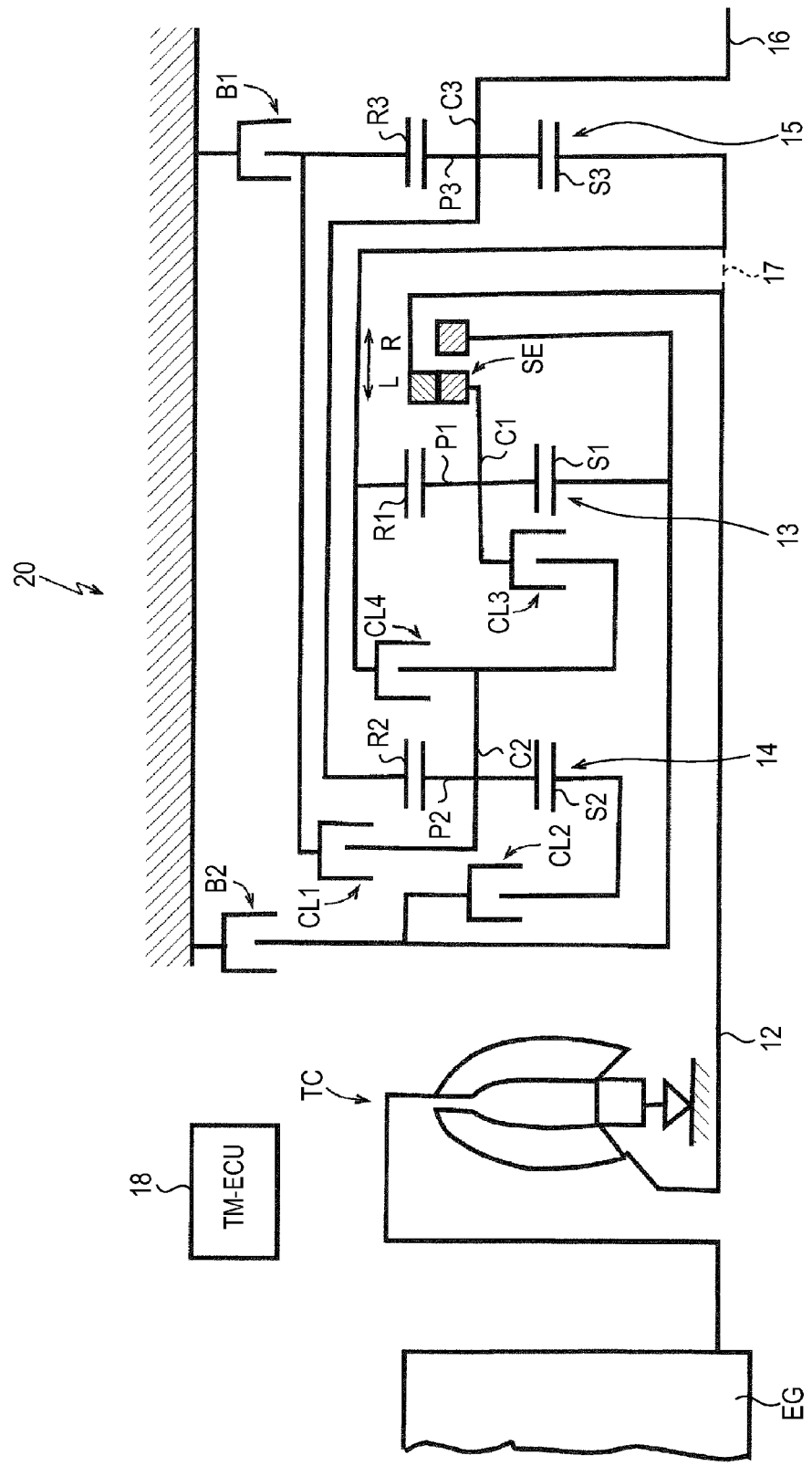
FIG. 4 is a schematic skeleton diagram illustrating a second embodiment of the vehicular automatic transmission of this disclosure.

Next, hereinafter, an automatic transmission 20 of a second embodiment of this disclosure will be described with reference to FIG. 4. The automatic transmission 20 of the second embodiment is a transmission in which the first planetary gear 13 and the second planetary gear 14 of the vehicular automatic transmission 10 are simply replaced in order of arrangement in the direction of the rotation shaft line 17, compared to the vehicular automatic transmission 10 in the above-described first embodiment as illustrated in FIG. 1. In other words, in a direction of the output shaft 16 from the input shaft 12, as illustrated in FIG. 4, the second planetary gear 14, the first planetary gear 13, and the third planetary gear 15 are arranged in order, and a linking configuration of the linking portion, the clutch, the brake, and the switching element SE is not changed.

Similarly to FIG. 2, as the vehicular automatic transmission 20 which is configured as described above selectively disengages the first clutch CL1, the second clutch CL2, the third clutch CL3, and the fourth clutch CL4, selectively allows the first brake B1 and the second brake B2 to operate, and allows the switching element SE to perform the switching operation, the rotation of the elements of the first planetary gear 13, the second planetary gear 14, and the third planetary gear 15 are restricted. Accordingly, it is possible to establish a gear shift stage having ten or more forward gear stages and one reverse gear stage.

A velocity ratio of each element of the first planetary gear 13, the second planetary gear 14, and the third planetary gear 15 in the reverse gear shift stage of the vehicular automatic transmission 20, shows a state which is illustrated in the velocity diagram illustrated in FIG. 3, similarly to the first embodiment. The rotating speed of the first ring gear R1 which is the highest rotating speed in the reverse gear shift stage is low compared to the rotating speed (higher rotating speed than that of the first ring gear R1 illustrated in FIG. 8) of the first sun gear S1 which is the highest rotating speed illustrated in FIG. 8, and an increase in rotating speed is suppressed.

Third Embodiment

Figure 5:
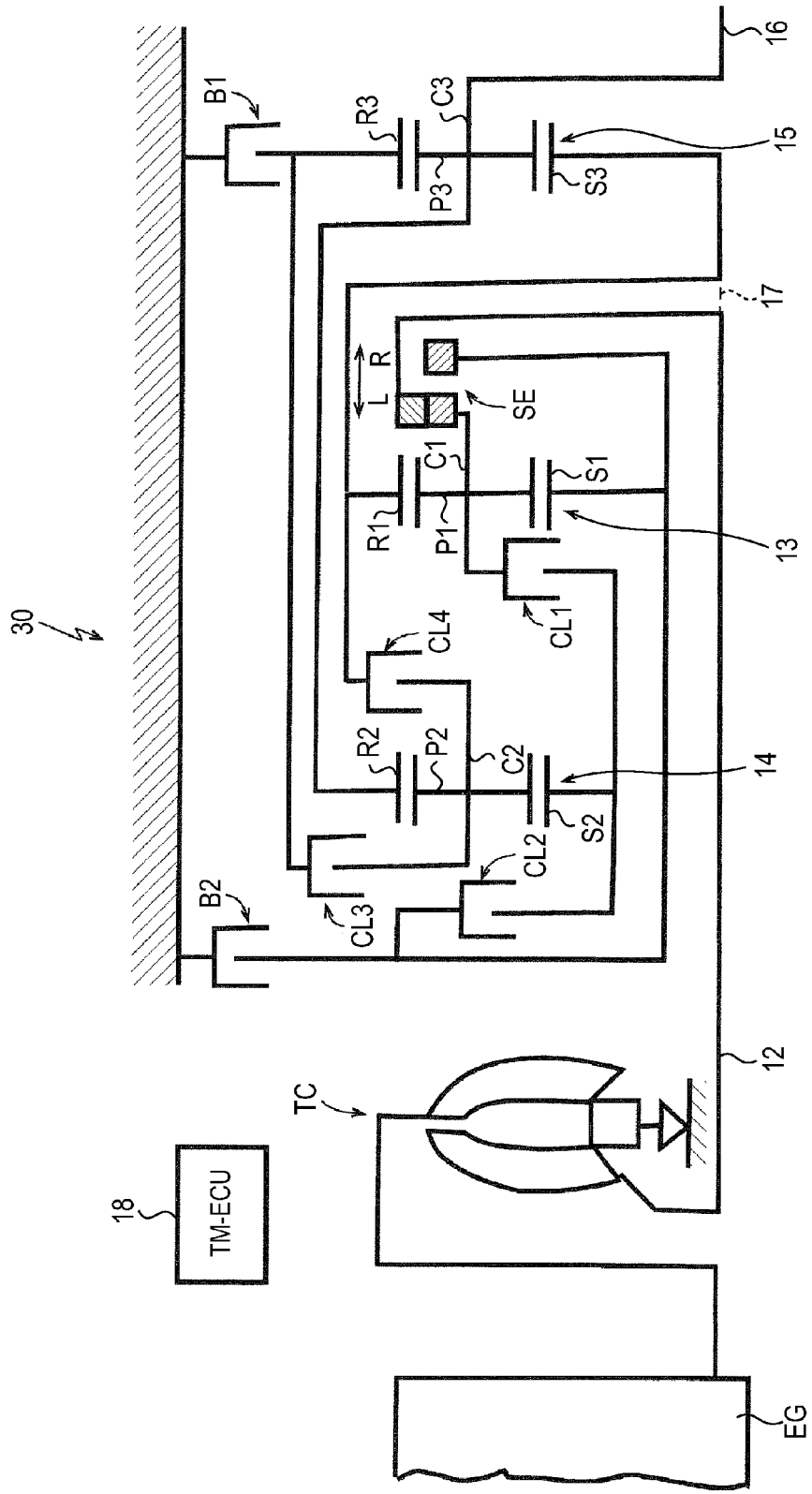
FIG. 5 is a schematic skeleton diagram illustrating a third embodiment of the vehicular automatic transmission of this disclosure.

Next, hereinafter, an automatic transmission 30 of a third embodiment of this disclosure will be described with reference to FIGS. 5 to 7. As illustrated in FIG. 5, the automatic transmission 30 of the third embodiment is provided with the input shaft 12, the second planetary gear 14, the first planetary gear 13, the third planetary gear 15, and the output shaft 16 which are sustained in order to be rotatable coaxially with the rotation shaft line 17, in the housing 11 which is attached to the vehicle body.

The first planetary gear 13 is provided with the first sun gear S1 which is sustained to be rotatable coaxially with the rotation shaft line 17, the first ring gear R1, the first pinion P1 which meshes with the first sun gear S1 and the first ring gear R1, and the first carrier C1 which sustains the first pinion P1. The first planetary gear 13 is the single pinion type planetary gear mechanism.

The second planetary gear 14 is provided with the second sun gear S2 which is sustained to be rotatable coaxially with the rotation shaft line 17, the second ring gear R2, the second pinion P2 which meshes with the second sun gear S2 and the second ring gear R2, and the second carrier C2 which sustains the second pinion P2. The second planetary gear 14 is the single pinion type planetary gear mechanism.

The third planetary gear 15 is provided with the third sun gear S3 which is sustained to be rotatable coaxially with the rotation shaft line 17, the third ring gear R3, the third pinion P3 which meshes with the third sun gear S3 and the third ring gear R3, and the third carrier C3 which sustains the third pinion P3. The third planetary gear 15 is the single pinion type planetary gear mechanism.

The input shaft 12 and the output shaft 16 are sustained to be rotatable around the rotation shaft line 17 in the housing 11. The input shaft 12 is a shaft member which inputs the output rotation power of the engine EG to the vehicular automatic transmission 10 via the torque converter TC. The output shaft 16 is a shaft member which outputs the output rotation power of which the speed is changed to the driving wheel via the differential gear (not illustrated) or the like.

The first carrier C1 of the first planetary gear 13 is linked to the input shaft 12. The third carrier C3 of the third planetary gear 15 is linked to the output shaft 16.

The second ring gear R2 of the second planetary gear 14 is linked to the third carrier C3 of the third planetary gear 15. The third sun gear S1 of the third planetary gear 15 is linked to the first ring gear R1 of the first planetary gear.

The first brake B1 fixes the third ring gear R3 of the third planetary gear 15 to be disengageable with respect to the inner circumferential surface of the housing 11. The first clutch CL1 links the first carrier C1 and the second sun gear S2 of the second planetary gear 14 to be disengageable from each other.

The second clutch CL2 links the first sun gear S1 of the first planetary gear 13 and the second sun gear S2 of the second planetary gear 14 to be disengageable from each other.

The third clutch CL3 links the second carrier C2 of the second planetary gear 14 and the third ring gear R3 of the third planetary gear 15 to be disengageable from each other.

The fourth clutch CL4 links the second carrier C2 of the second planetary gear 14, and the first ring gear R1 of the first planetary gear 13 and the third sun gear S3 of the third planetary gear 15 that are linked to each other, to be disengageable from each other.

The second brake B2 fixes the first sun gear S1 of the first planetary gear 13 to be disengageable with respect to the inner circumferential surface of the housing 11.

The switching element SE switches a linked state with the input shaft 12 into a non-switched state and a switched state. The switching element SE has a function of switching the position into two positions, and for example, the switching element SE can switch the position into two positions, such as the L position which is in a non-switched state, and the R position which is in a switched state, as a dog clutch type which is a meshing type clutch. As illustrated in FIG. 5, at the L position, the switching element SE links the input shaft 12 and the first carrier C1. In addition, at the R position, the switching element SE blocks the link between the input shaft 12 and the first carrier C1, and links the input shaft 12 and the second sun gear S2 which is linked via the first sun gear S1 and the second clutch CL2.

Operations of the first clutch CL1, the second clutch CL2, the third clutch CL3, the fourth clutch CL4, the first brake B1, the second brake B2, and the switching element SE are controlled by the transmission ECU (hereinafter, simply referred to as the TM-ECU) 18.

As illustrated in FIG. 6, as the vehicular automatic transmission 30 which is configured as described above selectively disengages the first clutch CL1, the second clutch CL2, the third clutch CL3, and the fourth clutch CL4, selectively allows the first brake B1 and the second brake B2 to operate, and allows the switching element SE to perform the switching operation, rotation of each element of the first planetary gear 13, the second planetary gear 14, and the third planetary gear 15 is restricted. Accordingly, it is possible to form a gear shift stage having ten forward gear stages and one reverse gear stage. In FIG. 6, a case where a white circle is marked in sections of each clutch and brake which correspond to each gear change stage, illustrates a connected and engaged state in a case of a clutch, and illustrates a fixed state where the rotation is restricted in a case of the brake. A case where an L is marked in the section of the switching element SE illustrates an L position, and a case where an R is marked illustrates a switched state at the R position.

By the TM-ECU 18, switching is performed to the R position at which the first brake B1 is in a fixed state, the second clutch CL2 and the third clutch CL3 are in an engaged state, and the switching element SE is in a switched state. Accordingly, the reverse gear shift stage is obtained. The velocity ratio of each element of the first planetary gear 13, the second planetary gear 14, and the third planetary gear 15 in the reverse gear shift stage of the vehicular automatic transmission 30, shows a state which is illustrated in a velocity diagram illustrated in FIG. 7.

Figure 7:
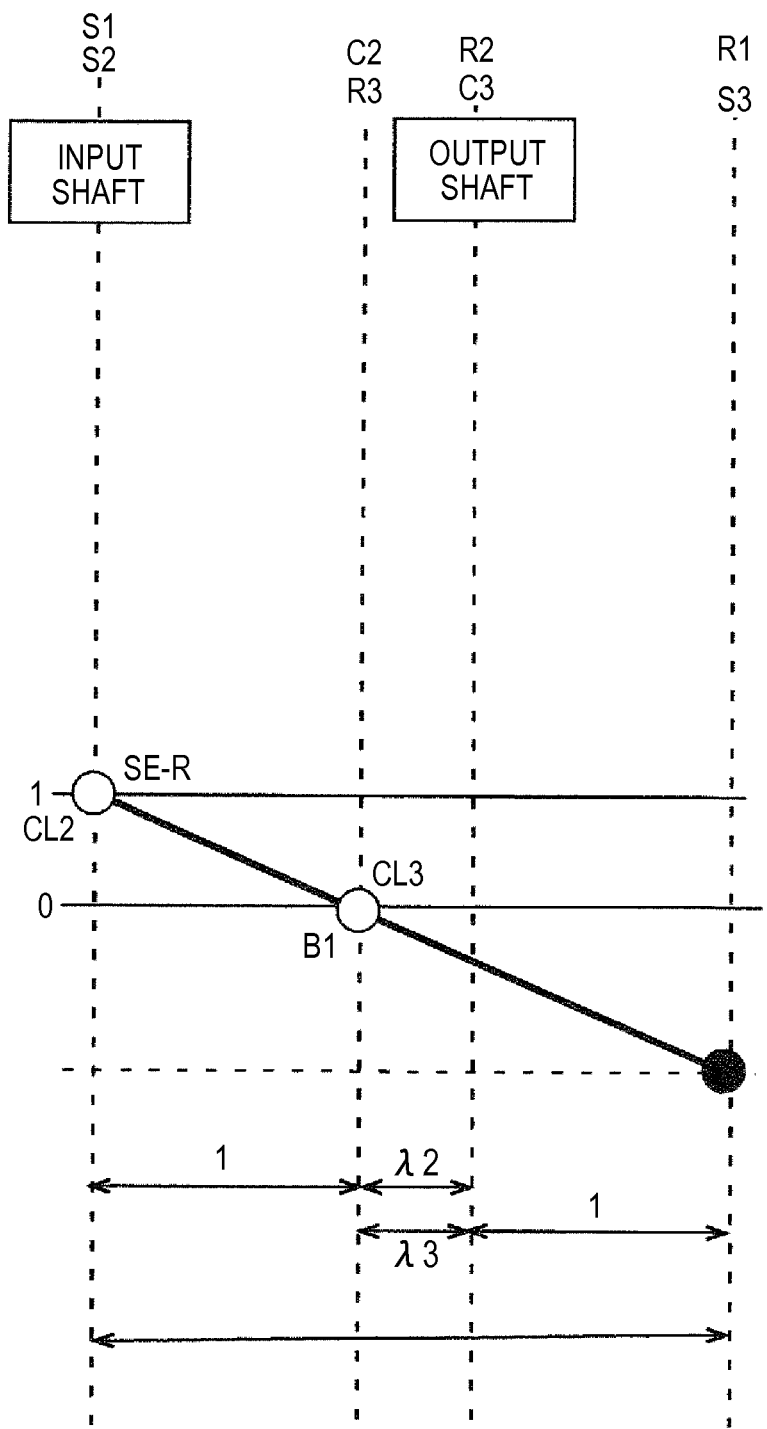
FIG. 7 is a velocity diagram illustrating a speed ratio of each element of a planetary gear in a reverse gear shift stage of the third embodiment.

In other words, in the velocity diagram illustrated in FIG. 7, the third carrier C3 which is connected to the second ring gear R2 is linked to the output shaft 16, the first ring gear R1 and the third sun gear S3 are linked, the second ring gear R2 and the third carrier C3 are linked, the second carrier C2 and the third ring gear R3 are linked by the third clutch CL3, and the input shaft 12, the first sun gear S1, and the second sun gear S2 are linked to each other by the switching element SE and the second clutch CL2. For this reason, each one vertical line that is given S1 and S2, C2 and R3, R2 and C3, and R1 and S3 is disposed in a direction of a horizontal axis with a certain interval corresponding to the gear ratio, and the velocity ratio corresponding to each element is illustrated in a direction of a vertical axis, similarly to FIG. 3.

As illustrated in FIG. 7, similarly to FIG. 3, in the reverse gear shift stage, the rotating speed of the first ring gear R1 of the first planetary gear 13 becomes the highest rotating speed in the reverse gear shift stage.

Since the rotating speed (illustrated in FIG. 7) of the first ring gear R1 which becomes the highest rotating speed in the reverse gear shift stage according to the embodiment is low compared to the rotating speed (higher rotating speed than that of the first ring gear R1 illustrated in FIG. 8) of the first sun gear S1 which is the highest rotating speed illustrated in FIG. 8, an increase in rotating speed is suppressed. In addition, by switching the position into the R position of the switching element SE, the input rotation from the input shaft 12 is input into the first sun gear S1 of the first planetary gear 13 according to the embodiment. For this reason, as illustrated in FIG. 7, the rotating speed of the first sun gear S1 is low compared to the rotating speed of the first ring gear R1 which is linked to the above-described third sun gear S3. For this reason, the rotating speed of the first ring gear R1 becomes the highest rotating speed in the reverse gear shift stage.

As described above, according to the vehicular automatic transmissions 10 and 20 of the first embodiment and the second embodiment of this disclosure, the housing 11, the input shaft 12 which is sustained to be rotatable around the rotation shaft line 17 in the housing 11, and the output shaft 16 which is sustained to be rotatable around the rotation shaft line 17 in the housing 11 are provided. The single pinion type first planetary gear 13, the second planetary gear 14, and the third planetary gear 15 are sustained in parallel coaxially with the rotation shaft line 17 in the housing 11, the input shaft 12 and the first carrier C1 of the first planetary gear 13 are linked, the output shaft 16 and the third carrier C3 of the third planetary gear 15 are linked, the third carrier C3 and the second ring gear R2 of the second planetary gear 14 are linked, and the third sun gear S3 and the first ring gear R1 of the first planetary gear 13 are linked. The first brake B1 which fixes the third ring gear R3 of the third planetary gear 15 to be disengageable with respect to the housing 11 is provided. The first clutch CL1 which links the third ring gear R3 and the second carrier C2 of the second planetary gear 14 to be disengageable from each other is provided. The switching element SE which blocks the link between the input shaft 12 and the first carrier C1 and switches a state into the switched state in which the input shaft 12 is linked to the second sun gear S2 of the second planetary gear 14 and the first sun gear S1 of the first planetary gear 13, is provided. In the reverse gear shift stage, the first clutch CL1 is in an engaged state, the first brake B1 is in a fixed state, and the switching element SE is in a switched state.

For this reason, in the reverse gear shift stage, as the switching element SE is in a switched state, the link between the first carrier C1 of the first planetary gear 13 and the input shaft 12 is blocked, the input shaft 12 is linked to the first sun gear S1 of the first planetary gear 13 and the second sun gear S2 of the second planetary gear 14, and the input rotation is input into the second sun gear S2 of the second planetary gear 14. The second carrier C2 of the second planetary gear 14 is linked to the third ring gear R3 of the third planetary gear 15 as the first clutch CL1 is connected, and the third ring gear R3 is fixed to the housing 11 as the first brake B1 is operated. For this reason, the second carrier C2 and the third ring gear R3 are fixed and do not rotate. Accordingly, the reverse rotation of which a rotating direction is reverse to that of the input shaft 12 is generated to the second ring gear R2 of the second planetary gear 14. As the reverse rotation is transferred to the third carrier C3 of the third planetary gear 15, the output of the reverse rotation from the third carrier C3 of the third planetary gear 15 is obtained. Since the third ring gear R3 is fixed and the third carrier C3 reversely rotates with the same rotating speed as that of the output, the third sun gear S3 reversely rotates at a higher rotating speed than that of the output, and the rotating speed of the first ring gear R1 of the first planetary gear 13 which is linked to the third sun gear S3 also becomes the same as that of the third sun gear S3. The rotating speed of the first ring gear R1 becomes the highest rotating speed in the reverse gear shift stage. Similarly to the technology according to the above-described Reference 1, since the rotating speed (illustrated in FIG. 3) of the first ring gear R1 is low compared to the rotating speed (illustrated in FIG. 8) of the first sun gear S1 which is the highest rotating speed that becomes a much higher rotating speed than the rotating speed of the first ring gear R1 by inputting the input rotation into the first carrier C1 of the first planetary gear, an increase in rotating speed is suppressed. In addition, by the operation of the switching element SE in the reverse gear shift stage, the input rotation is input into the first sun gear S1 of the first planetary gear 13 according to this disclosure. For this reason, since the rotating speed of the first sun gear S1 is lower than the rotating speed of the first ring gear R1 which is linked to the third sun gear S3 as illustrated in FIG. 3, the rotating speed of the first ring gear R1 becomes the highest rotating speed in the reverse gear shift stage.

As described above, according to the vehicular automatic transmissions 10 and 20 of the first embodiment and the second embodiment of this disclosure, the second clutch CL2 which links the switching element SE and the second sun gear S2 to be disengageable is further provided, the second clutch CL2 is disposed between the switching element SE and the second sun gear S2, and the second sun gear S2 is linked to the input shaft 12 by the operation of the second clutch CL2 when the switching element SE is in a switched state.

As described above, according to the vehicular automatic transmissions 10 and 20 of the first embodiment and the second embodiment of this disclosure, since the third clutch CL3 which links the first carrier C1 and the second carrier C2 to be disengageable from each other, the fourth clutch CL4 which links the first ring gear R1 and the second carrier C2 to be disengageable from each other, and the second brake B2 which fixes the first sun gear S1 to be disengageable with respect to the housing 11, are provided, when the second ring gear R2 and the third carrier C3 are linked, it is possible to form a gear shift stage having ten or more forward gear stages and one reverse gear stage.

In addition, in this configuration, even when the switching element SE is not provided, by fastening the second clutch CL2, the third clutch CL3, and the first brake B1, it is possible to form the reverse gear stage. In addition, when the switching element SE is provided, it is possible to further suppress the rotation of the first sun gear S1.

As described above, according to the vehicular automatic transmission 30 of the third embodiment of this disclosure, the housing 11, the input shaft 12 which is sustained to be rotatable around rotation shaft line 17 in the housing 11, and the output shaft 16 which is sustained to be rotatable around the rotation shaft line 17 in the housing 11, are provided. The single pinion type first planetary gear 13, the second planetary gear 14, and the third planetary gear 15 are sustained in parallel coaxially with the rotation shaft line 17 in the housing 11, the input shaft 12 and the first carrier C1 of the first planetary gear 13 are linked, the output shaft 16 and the third carrier C3 of the third planetary gear 15 are linked, the first carrier C1 and the second sun gear S2 of the second planetary gear 14 are linked, the third carrier C3 and the second ring gear R2 of the second planetary gear 14 are linked, and the third sun gear S3 and the first ring gear R1 of the first planetary gear 13 are linked. The first brake B1 which fixes the third ring gear R3 of the third planetary gear 15 to be disengageable with respect to the housing 11 is provided. The third clutch CL3 which links the third ring gear R3 and the second carrier C2 of the second planetary gear 14 to be disengageable from each other is provided. The switching element SE which blocks the link between the input shaft 12 and the first carrier C1 and switches a state into the switched state in which the input shaft 12 is linked to the second sun gear S2 of the second planetary gear 14 and the first sun gear S1 of the first planetary gear 13, is provided. The first clutch CL1 which links the first carrier C1 and the second sun gear S2 of the second planetary gear 14 to be disengageable from each other is provided. In the reverse gear shift stage, the first clutch CL1 is in a disengaged state, the third clutch CL3 is in an engaged state, the first brake B1 is in a fixed state, and the switching element SE is in a switched state.

For this reason, as illustrated in the above-described Reference 1, even in a configuration in which the first carrier C1 is linked to the second sun gear S2, in the reverse gear shift stage, the link between the first carrier C1 of the first planetary gear 13 and the input shaft 12 is blocked as the switching element SE is in a switched state, the input shaft 12 is linked to the first sun gear S1 of the first planetary gear 13 and the second sun gear S2 of the second planetary gear 14, and the input rotation is input into the second sun gear S2 of the second planetary gear 14. In a disengaged state of the first clutch CL1, since the link between the second sun gear S2 and the first carrier C1 is released, the input rotation is not input into the first carrier C1. As the second carrier C2 of the second planetary gear 14 is linked to the third ring gear R3 of the third planetary gear 15 and the first brake B1 is operated by connecting the third clutch CL3, the third ring gear R3 is fixed to the housing 11. For this reason, the second carrier C2 and the third ring gear R3 are fixed and do not rotate. Accordingly, the reverse rotation of which a rotating direction is reverse to that of the input shaft 12 is generated to the second ring gear R2 of the second planetary gear 14. As the reverse rotation is transferred to the third carrier C3 of the third planetary gear 15, the output of the reverse rotation from the third carrier C3 of the third planetary gear 15 is obtained. Since the third ring gear R3 is fixed and the third carrier C3 reversely rotates with the same rotating speed as that of the output, the third sun gear S3 reversely rotates at a higher rotating speed than that of the output, and the rotating speed of the first ring gear R1 of the first planetary gear 13 which is linked to the third sun gear S3 also becomes the same as that of the third sun gear S3. The rotating speed of the first ring gear R1 becomes the highest rotating speed in the reverse gear shift stage. Similarly to the technology according to the above-described Reference 1, since the rotating speed (illustrated in FIG. 7) of the first ring gear R1 is low compared to the rotating speed (illustrated in FIG. 8) of the first sun gear S1 which is the highest rotating speed that becomes a much higher rotating speed than the rotating speed of the first ring gear R1 by inputting the input rotation into the first carrier C1 of the first planetary gear, an increase in rotating speed is suppressed. In addition, by the operation of the switching element SE, the input rotation is input into the first sun gear S1 of the first planetary gear 13 according to this disclosure. For this reason, since the rotating speed of the first sun gear S1 is lower than the rotating speed of the first ring gear R1 which is linked to the third sun gear S3 as illustrated in FIG. 7, the rotating speed of the first ring gear R1 becomes the highest rotating speed in the reverse gear shift stage.

As described above, according to the vehicular automatic transmission 30 of the third embodiment of this disclosure, the second clutch CL2 which links the switching element SE and the second sun gear S2 to be disengageable from each other is further provided, the second clutch CL2 is disposed between the switching element SE and the second sun gear S2, and the second sun gear S2 is linked to the input shaft 12 by the operation of the second clutch CL2 when the switching element SE is in a switched state.

As described above, according to the vehicular automatic transmission 30 of the third embodiment of this disclosure, since the fourth clutch CL4 which links the first ring gear R1 and the second carrier C2 to be disengageable from each other, and the second brake B2 which fixes the first sun gear S1 of the first planetary gear 13 to be disengageable with respect to the housing 11 are provided, when the second ring gear R2 and the third carrier C3 are linked, it is possible to form a reverse gear shift stage having ten forward gear stages and one reverse gear stage.

As described above, according to the vehicular automatic transmissions 10, 20, and 30 of the first to the third embodiments of this disclosure, since the switching element SE is configured using the dog clutch, the configuration of the switching element becomes simple.

In addition, when a plurality of embodiments exist, unless there is particular description, it is possible to appropriately combine specific parts of each embodiment.

An aspect of this disclosure is directed to a vehicular automatic transmission, including: a housing; an input shaft which is sustained to be rotatable around a rotation shaft line in the housing; an output shaft which is sustained to be rotatable around the rotation shaft line in the housing; single pinion type first, second and third planetary gears which are sustained in parallel coaxially with the rotation shaft line in the housing as the input shaft and a first carrier of the first planetary gear are linked to each other, the output shaft and a third carrier of the third planetary gear are linked to each other, the third carrier and a second ring gear of the second planetary gear are linked to each other, and a third sun gear and a first ring gear of the first planetary gear are linked to each other; a first brake which fixes a third ring gear of the third planetary gear to be disengageable with respect to the housing; a first clutch which links the third ring gear and a second carrier of the second planetary gear to be disengageable from each other; and a switching element which blocks the link between the input shaft and the first carrier, and switches the input shaft to be in a switched state in which the input shaft is linked to a second sun gear of the second planetary gear and a first sun gear of the first planetary gear. In a reverse gear shift stage, the first clutch is in an engaged state, the first brake is in a fixed state, and the switching element is in a switched state.

According to this configuration, in the reverse gear shift stage, as the switching element is in a switched state, the link between the first carrier of the first planetary gear and the input shaft is blocked, the input shaft is linked to the first sun gear of the first planetary gear and the second sun gear of the second planetary gear, and input rotation is input into the second sun gear of the second planetary gear. The second carrier of the second planetary gear is linked to the third ring gear of the third planetary gear as the first clutch is connected, and the third ring gear is fixed to the housing as the first brake is operated. For this reason, the second carrier and the third ring gear are fixed and do not rotate. Accordingly, reverse rotation of which a rotating direction is reverse to that of the input shaft is generated to the second ring gear of the second planetary gear. By transferring the reverse rotation to the third carrier of the third planetary gear, an output of the reverse rotation from the third carrier of the third planetary gear is obtained. Since the third ring gear is fixed, and the third carrier reversely rotates at the same rotating speed as that of the output, the third sun gear reversely rotates at a higher rotating speed than that of the output, and the first ring gear of the first planetary gear which is linked to the third sun gear also rotates at the same rotating speed. The rotating speed of the first ring gear becomes the highest rotating speed in the reverse gear shift stage. Similarly to the technology according to the above-described Reference 1, since the rotating speed of the first ring gear is low compared to the rotating speed of the first sun gear which is the highest rotating speed that further becomes a higher rotating speed than the rotating speed of the first ring gear as the input rotation is input into the first carrier of the first planetary gear, an increase in rotating speed is suppressed. In addition, in the first sun gear of the first planetary gear according to this disclosure, by an operation of a switching element SE in the reverse gear shift stage, the input rotation is input. For this reason, since the rotating speed of a first sun gear S1 is lower than the rotating speed of the first ring gear which is linked to the third sun gear, the rotating speed of the first ring gear becomes the highest rotating speed in the reverse gear shift stage.

In the vehicular automatic transmission according to the aspect described above, the vehicular automatic transmission may further include a second clutch which links the switching element and the second sun gear to be disengageable from each other, the second clutch may be disposed between the switching element and the second sun gear, and in the switched state of the switching element, the second sun gear may be linked to the input shaft by an operation of the second clutch.

In the vehicular automatic transmission according to the aspect described above, the vehicular automatic transmission may further include a third clutch which links the first carrier and the second carrier to be disengageable from each other, a fourth clutch which links the first ring gear and the second carrier to be disengageable from each other, and a second brake which fixes the first sun gear to be disengageable with respect to the housing.

According to this configuration, when the second ring gear and the third carrier are linked to each other, it is possible to form a gear shift stage having ten or more forward gear stages and one reverse gear stage.

In addition, in this configuration, even when the switching member is not provided, by fastening the second clutch, the third clutch, and the first brake, it is possible to form the reverse gear stage. In addition, when the switching element is provided, it is possible to further suppress the rotation of the first sun gear.

Another aspect of this disclosure is directed to a vehicular automatic transmission including: a housing; an input shaft which is sustained to be rotatable around a rotation shaft line in the housing; an output shaft which is sustained to be rotatable around the rotation shaft line in the housing; single pinion type first, second and third planetary gears which are sustained in parallel coaxially with the rotation shaft line in the housing as the input shaft and a first carrier of the first planetary gear are linked to each other, the output shaft and a third carrier of the third planetary gear are linked to each other, the first carrier and a second sun gear of the second planetary gear are linked to each other, the third carrier and a second ring gear of the second planetary gear are linked to each other, and a third sun gear and a first ring gear of the first planetary gear are linked to each other; a first brake which fixes a third ring gear of the third planetary gear to be disengageable with respect to the housing; a third clutch which links the third ring gear and a second carrier of the second planetary gear to be disengageable from each other; a switching element which blocks the link between the input shaft and the first carrier, and switches the input shaft to be in a switched state in which the input shaft is linked to the second sun gear of the second planetary gear and a first sun gear of the first planetary gear; and a first clutch which links the first carrier and the second sun gear of the second planetary gear to be disengageable from each other. In a reverse gear shift stage, the first clutch is in a disengaged state, the third clutch is in an engaged state, the first brake is in a fixed state, and the switching element is in a switched state.

According to this configuration, in the reverse gear shift stage, as the switching element is in a switched state, the link between the first carrier of the first planetary gear and the input shaft is blocked, the input shaft is linked to the first sun gear of the first planetary gear and the second sun gear of the second planetary gear, and the input rotation is input into the second sun gear of the second planetary gear. The second carrier of the second planetary gear is linked to the third ring gear of the third planetary gear as the third clutch is connected, and the third ring gear is fixed to the housing as the first brake is operated. For this reason, the second carrier and the third ring gear are fixed and do not rotate. Accordingly, reverse rotation of which a rotating direction is reverse to that of the input shaft is generated to the second ring gear of the second planetary gear. By transferring the reverse rotation to the third carrier of the third planetary gear, an output of the reverse rotation from the third carrier of the third planetary gear is obtained. Since the third ring gear is fixed, and the third carrier reversely rotates at the same rotating speed as that of the output, the third sun gear reversely rotates at a higher rotating speed than that of the output, and the first ring gear of the first planetary gear which is linked to the third sun gear also rotates at the same rotating speed. The rotating speed of the first ring gear becomes the highest rotating speed in the reverse gear shift stage. Similarly to the technology according to Reference 1, since the rotating speed of the first ring gear is low compared to the rotating speed of the first sun gear which is the highest rotating speed that further becomes a higher rotating speed than the rotating speed of the first ring gear as the input rotation is input into the first carrier of the first planetary gear, an increase in rotating speed is suppressed. In addition, in the first sun gear of the first planetary gear according to this disclosure, by an operation of the switching element in the reverse gear shift stage, the input rotation is input. For this reason, since the rotating speed of a first sun gear $S1$ is lower than the rotating speed of the first ring gear which is linked to the third sun gear, the rotating speed of the first ring gear becomes the highest rotating speed in the reverse gear shift stage.

In the vehicular automatic transmission according to the aspect described above, the vehicular automatic transmission may further include a second clutch which links the switching element and the second sun gear to be disengageable from each other, the second clutch may be disposed between the switching element and the second sun gear, and in the switched state of the switching element, the second sun gear may linked to the input shaft by an operation of the second clutch.

In the vehicular automatic transmission according to the aspect described above, the vehicular automatic transmission may further include a fourth clutch which links the first ring gear and the second carrier to be disengageable from each other, and a second brake which fixes the first sun gear of the first planetary gear to be disengageable with respect to the housing.

According to this configuration, when the second ring gear and the third carrier are linked to each other, it is possible to form a gear shift stage having ten forward gear stages and one reverse gear stage.

In addition, in this configuration, even when the switching member is not provided, by fastening the first clutch, the third clutch and the first brake, it is possible to form the reverse gear stage. In addition, when the switching element is provided, it is possible to further suppress the rotation of the first sun gear.

In the vehicular automatic transmission according to the aspect described above, the switching element may be configured using a dog clutch.

According to this configuration, the configuration of the switching element becomes simple.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:
1. A vehicular automatic transmission, comprising:
a housing;
an input shaft which is sustained to be rotatable around a rotation shaft line in the housing;
an output shaft which is sustained to be rotatable around the rotation shaft line in the housing;

single pinion type first, second and third planetary gear sets which are sustained in parallel coaxially with the rotation shaft line in the housing as the input shaft and a carrier of the first planetary gear set are linked to each other, the output shaft and a carrier of the third planetary gear set are linked to each other, the carrier of the third planetary gear set and a ring gear of the second planetary gear set are linked to each other, and a sun gear of the third planetary gear set and a ring gear of the first planetary gear set are linked to each other;

a first brake which selectively fixes a ring gear of the third planetary gear set with respect to the housing;

a first clutch which selectively links the ring gear of the third planetary gear set and a carrier of the second planetary gear set; and a switching element which blocks the link between the input shaft and the carrier of the first planetary gear set, and switches the input shaft to be in a switched state in which the input shaft is linked to a sun gear of the second planetary gear set and a sun gear of the first planetary gear set, wherein, in a reverse gear shift stage, the first clutch is in an engaged state, the first brake is in a fixed state, and the switching element is in a switched state.

2. The vehicular automatic transmission according to claim 1, further comprising:

a second clutch which selectively links the switching element and the sun gear of the second planetary gear set, wherein, the second clutch is disposed between the switching element and the sun gear of the second planetary gear set, and in the switched state of the switching element, the sun gear of the second planetary gear set is linked to the input shaft by an operation of the second clutch.

3. The vehicular automatic transmission according to claim 2, further comprising:

a third clutch which selectively links the carrier of the first planetary gear set and the carrier of the second planetary gear set;

a fourth clutch which selectively links the ring gear of the first planetary gear set and the carrier of the second planetary gear set; and a second brake which selectively fixes the sun gear of the first planetary gear set with respect to the housing.

4. A vehicular automatic transmission, comprising:

a housing;

an input shaft which is sustained to be rotatable around a rotation shaft line in the housing;

an output shaft which is sustained to be rotatable around the rotation shaft line in the housing;

single pinion type first, second and third planetary gear sets which are sustained in parallel coaxially with the rotation shaft line in the housing as the input shaft and a carrier of the first planetary gear set are linked to each other, the output shaft and a carrier of the third planetary gear set are linked to each other, the carrier of the first planetary gear set and a sun gear of the second planetary gear set are linked to each other, the carrier of the third planetary gear set and a ring gear of the second planetary gear set are linked to each other, and a sun gear of the third planetary gear set and a ring gear of the first planetary gear set are linked to each other;

a first brake which selectively fixes a ring gear of the third planetary gear set with respect to the housing;

a third clutch which selectively links the ring gear of the third planetary gear set and a carrier of the second planetary gear set;

a switching element which blocks the link between the input shaft and the carrier of the first planetary gear set, and switches the input shaft to be in a switched state in which the input shaft is linked to the sun gear of the second planetary gear set and a sun gear of the first planetary gear set; and a first clutch which selectively links the carrier of the first planetary gear set and the sun gear of the second planetary gear set, wherein, in a reverse gear shift stage, the first clutch is in a disengaged state, the third clutch is in an engaged state, the first brake is in a fixed state, and the switching element is in a switched state.

5. The vehicular automatic transmission according to claim 4, further comprising:

a second clutch which selectively links the switching element and the sun gear of the second planetary gear set, wherein, the second clutch is disposed between the switching element and the sun gear of the second planetary gear set, and in the switched state of the switching element, the sun gear of the second planetary gear set is linked to the input shaft by an operation of the second clutch.

6. The vehicular automatic transmission according to claim 5, further comprising:

a fourth clutch which selectively links the ring gear of the first planetary gear set and the carrier of the second planetary gear set; and a second brake which selectively fixes the sun gear of the first planetary gear set with respect to the housing.

7. The vehicular automatic transmission according to claim 1, wherein the switching element comprises a dog clutch.

8. The vehicular automatic transmission according to claim 4, wherein the switching element comprises a dog clutch.

* * * * *